United States Patent [11] 3,627,377

[72] Inventor Joseph Pickles
       Birmingham, Mich.
[21] Appl. No. 877,623
[22] Filed Nov. 18, 1969
[45] Patented Dec. 14, 1971
[73] Assignee Ferro Manufacturing Corporation
       Detroit, Mich.

[54] TOP LIFT ACTUATOR
     13 Claims, 10 Drawing Figs.
[52] U.S. Cl. .................................................. 296/117, 74/89.16
[51] Int. Cl. ................................................. B60j 7/12
[50] Field of Search .......................................... 296/117; 74/801, 421, 89.16

[56] References Cited
     UNITED STATES PATENTS
| | | | |
|---|---|---|---|
| 1,886,952 | 11/1932 | Hodeaux | 74/421 |
| 2,710,223 | 6/1955 | Vigmostad | 296/117 |
| 3,472,551 | 10/1969 | Pickles | 296/117 |
| 3,511,114 | 5/1970 | Schnepel | 74/801 |

Primary Examiner—Benjamin Hersh
Assistant Examiner—Robert R. Song
Attorney—Whittemore, Hulbert & Belknap ABSTRACT: An actuator for a collapsible top of a vehicle comprising a compact arrangement of series connected planetary or epicyclic gear sets including a fixed ring gear common to all sets serving as a pivot mounting for an actuating arm.

INVENTOR.
JOSEPH PICKLES
BY Whittemore
Hulbert & Belknap
ATTORNEYS

PATENTED DEC 14 1971 3,627,377

INVENTOR.
JOSEPH PICKLES
BY Whittemore,
Hulbert & Belknap
ATTORNEYS

3,627,377

TOP LIFT ACTUATOR

CROSS-REFERENCE TO RELATED APPLICATION

The present invention represents an improvement over applicant's prior patent entitled "Top Lift Slave Assembly." U.S. Pat. No. 3,472,551, issued Oct. 14, 1969.

SUMMARY OF THE INVENTION

The present invention comprises a power unit adapted to be connected to a relatively small and compact electric motor and includes a worm and worm gear connected to a plurality, specifically three, stages of planetary or epicyclic gearing.

The power unit comprises a stationary frame which partially encloses the gearing and which carries a pivoted power output arm. The stationary frame includes an elongated ring gear provided with teeth at its interior and with a cylindrical external bearing surface. The pivoted arm is formed of mating sections the inner end portion of which is cylindrically shaped to be mounted on the external cylindrical surface of the ring gear. The inner end of the arm is also shaped to substantially complete the enclosure of the gearing.

DETAILED DESCRIPTION

Figure 2:
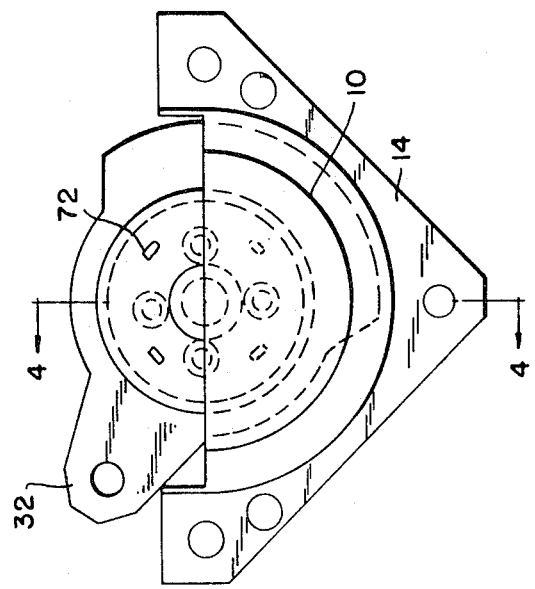
FIG. 2 is a rear elevation of the actuator assembly.
Figure 3:
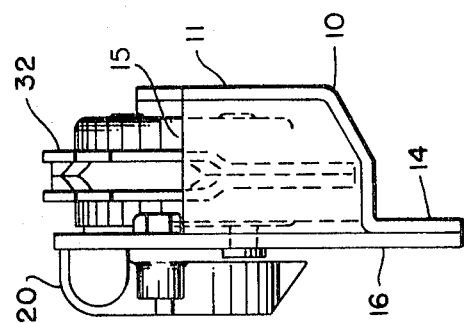
FIG. 3 is a side view looking from the left in FIG. 2.

Referring now to the drawings the actuator comprises a housing structure made up of a mounting cup 10 having a flat bottom wall 11 apertured as indicated at 12 for the reception of a mounting pin 13. The cup includes a peripherally extending flange 14 and is open at one side as indicated at 15. Associated with the cup 10 is a plate 16 suitably secured to the cup to maintain the parts in assembly. The flange 14 and the peripheral portion of the plate 16 are apertured as indicated at 18 and when the assembly is solidly bolted to the vehicle, the attaching bolts provide permanent rigid connection between the cup 10 and the plate 16.

Suitably attached to the plate 16 is a cover 20 having an opening 22 therethrough for the reception of one end of the pin 13. The other end of the pin 13 is a headed as indicated at 24 and is mounted in the opening 12 by suitable bearing means indicated generally at 26.

The plate 16 is provided with an enlarged circular opening 28 within which is fitted a reduced end portion of a cylindrical ring gear 30. The reduced end portion of the ring gear is press fitted within the opening 28 and is brazed therein to provide a rigid construction.

The actuating arm indicated generally at 32 extends radially of the pin or shaft 13 and is formed of two arm members 34 and 36. The arm member 34 includes a cupped portion having a cylindrical wall 38 and a generally flat bottom wall 40. The arm member 32 is provided with a cylindrical sleeve portion 42. The two arm portions are assemblied together and welded and together form an enclosure which cooperates with the housing formed by the cup 10 and the plate 16 to substantially completely enclose the gearing which will subsequently be described.

At this time however, it is important to note that the inner end of the arm 32 comprises a cylindrical sleeve formed by the portions 38 and 36 which are adapted to fit closely with the outer cylindrical surface of the ring gear 30 and to provide a firm but accurately centered bearing structure for the pivoted arm.

Inasmuch as the construction is designed for the purpose of producing a relatively great mechanical advantage, necessary because of the great forces required to open and close a folding top structure, while at the same time permitting the use of a compact electric motor, the construction encompasses a worm and worm gear unit driving a series or cascade connection of a plurality of planetary or epicyclic gear sets. Specifically, the gear includes an input worm 44 which is mounted on a shaft 46 and protected by the cover 20 which is attached to the outer surface of the plate 16. The worm 44 drives a worm gear 48 the center portion of which has a splined connection to the first-stage sun gear 50 which in turn is journaled on the shaft or pin 13. The first-stage outer plate 52 carries three mounting pins 54 which are staked into openings in the outer plate 52. The pins 54 include enlarged portions 56 on which are mounted planet gears 58, the gears being retained in place by an enlarged head 59 formed on the pins. Preferably, three planet gears are provided in each of the first and second stages, although as will subsequently appear, four are provided in the third-stage. The planet gears 58 mesh with the sun gear 50 which is rotated by the worm gear 48, and mesh also with the stationary fixed ring gear 30. Accordingly, as the input sun gear 50 is rotated, planet gears 58 are rotated and caused to revolve around the ring gear 30 and impart rotation to the first-stage mounting plate 52. The plate 52 is provided with a central splined opening 60 which receives the second-stage input sun gear 61, the reduced end portion of which is preferably splined and additionally brazed to the mounting plate 52.

The second-stage planetary pinions 62 are mounted on pins 63 having reduced ends which are preferably stacked and brazed into openings 64 provided in the second-stage mounting plate 66. It will be observed that the planet gears 62 are driven in rotation by the second-stage input sun gear 61 and since these are in mesh with the teeth of the stationary ring gear 30, their rotation causes them to orbit or revolve about the axis of the pin or shaft 13, thus imparting rotation to the second-stage mounting plate 66.

The mounting plate 66 is provided with a central splined opening 68 which is adapted to receive the splined end of the elongated third-stage sun gear 70. Accordingly, the sun gear 70 is rotated on the shaft 13 as a consequence of rotation of the input worm 44.

Figure 1:
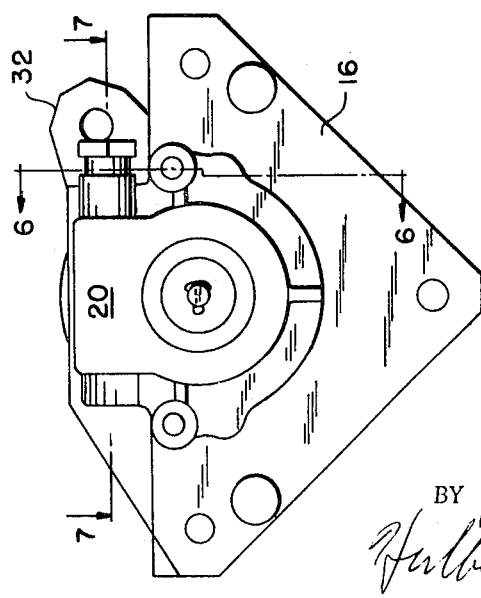
FIG 1 is a front elevation of the actuator assembly.
Figure 4:
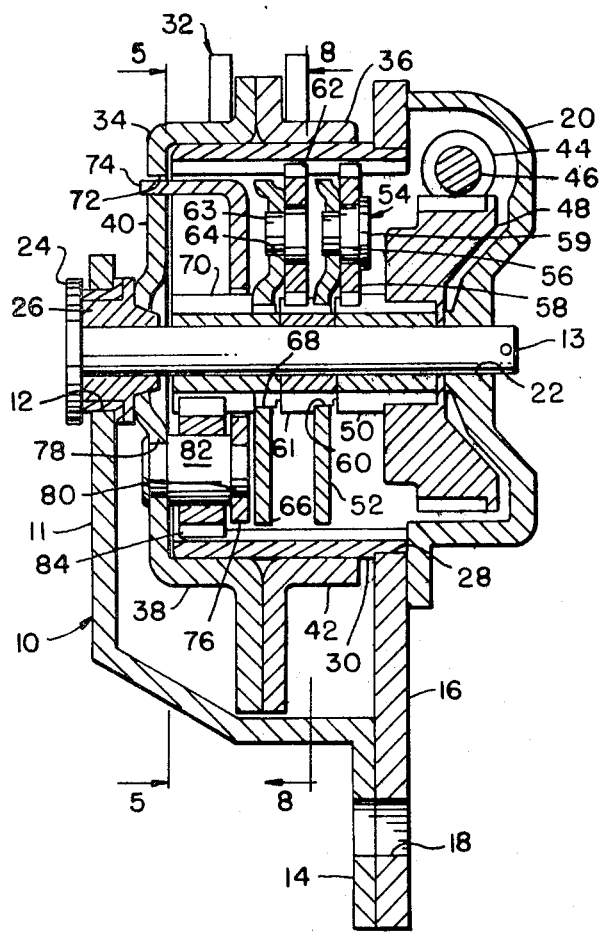
FIG. 4 is a section on the line 4—4, FIG. 2.
Figure 6:
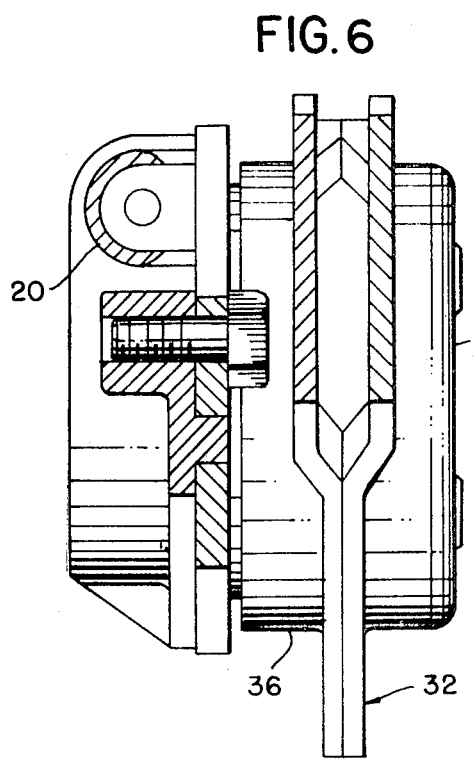
FIG. 6 is a section on the line 6—6, FIG. 1.
Figure 5:
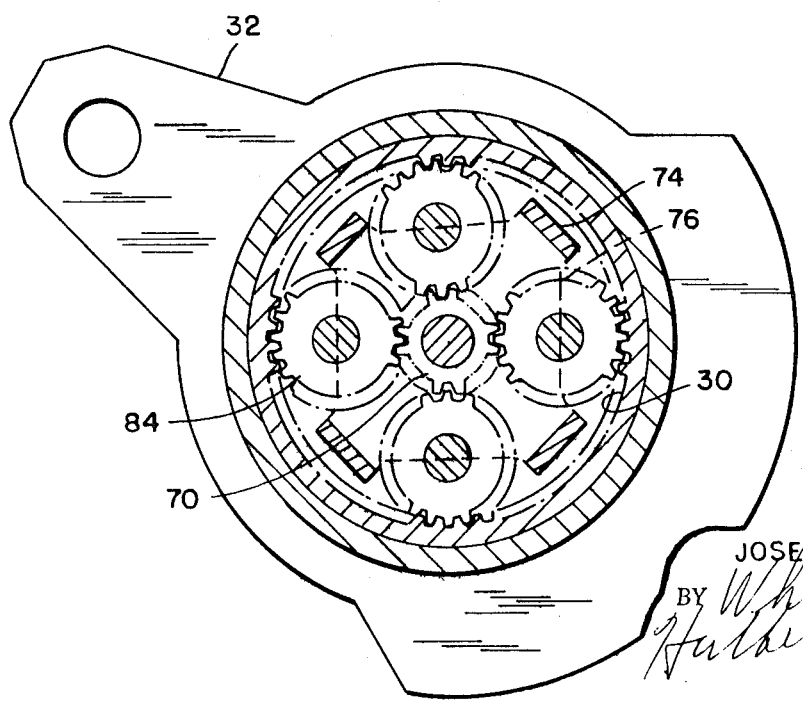
FIG. 5 is a section on the line 5—5, FIG. 4.
Figure 8:
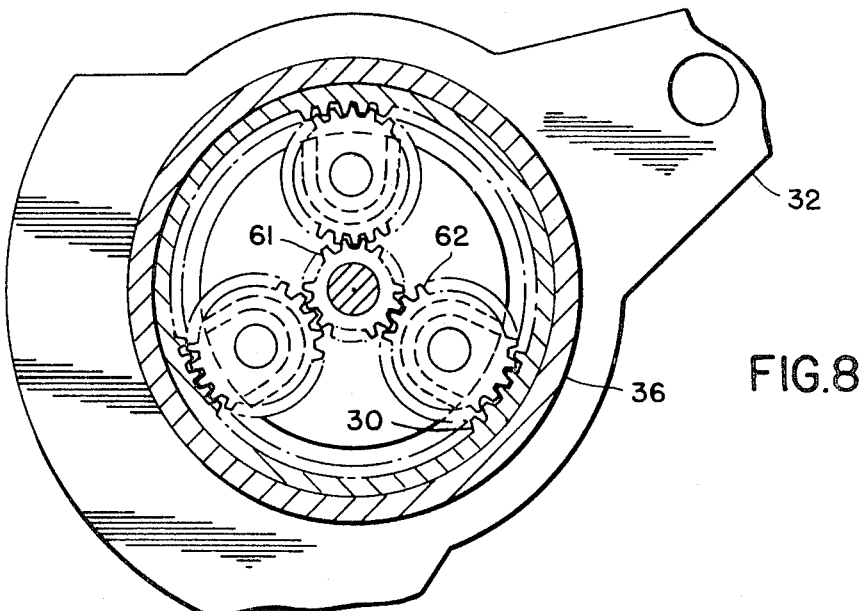
FIG. 8 is a section on the line 8—8, FIG. 4.
Figure 7:
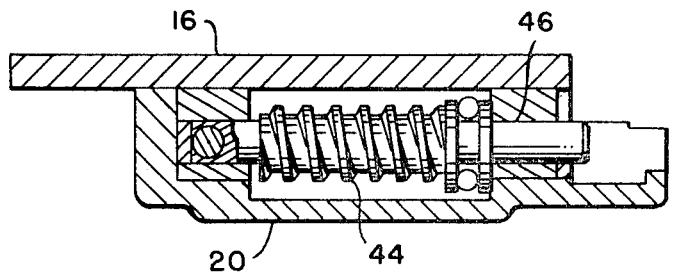
FIG. 7 is a section on the line 7—7, FIG. 1.

The output arm 32, as previously described, includes an arm portion 34 having a flat end or bottom wall 40 which as seen in FIGS. 1 and 2, is provided with openings 72 which receive laterally bent arms 74 the ends of which are preferably upset and brazed to provide a permanent rigid connection between the wall portion 40 and a gear retainer plate 76. The wall 40 is provided with a plurality, herein shown as four, openings 78 and the gear retainer plate 76 is provided with similar and aligned openings 80. Support pins 82 having reduced ends as shown in FIG. 4 received in the openings 78 and 80, support planet gears 84 which are in mesh simultaneously with the third-stage input sun gear 70 and the teeth of the internal ring gear 30. Accordingly, rotation of the input sun gear 70 causes rotation of the planet gears 84 which in turn causes them to revolve relative to the ring gear 30, thus imparting rotation to the output arm 32.

The arrangement is characterized particularly by the compactness of its arrangement, while at the same time providing the necessary power multiplication and the consequential strength of parts to produce the high output torque. It will be observed that the output planet gears 84 are four in number and are of a width substantially exceeding the width of a first and second-stage planet gears 58 and 62.

In connecting the actuator to the power top of a vehicle two arrangements are possible. In the first place, the housing including the cup 10 may constitute the pivot support for the entire top assembly, in which case the output arm 32 is shaped to form the main arm of the top assembly, or is shaped for rigid mechanical connection thereto.

In convertible tops the articulated linkage which is folded and unfolded as the top is lowered and raised, is actuated by a link connected between a fixed pivot support on the automobile and a portion of the folding or articulated linkage of the top.

In this case the link may if desired, b connected at one end to a portion of the housing support structure 10, 16. Alternatively of course, although the arm 32 may constitute the actual pivot mounting of the entire top structure, the pivot for the link which produces folding movement of the articulated top structure may be connected to a completely independent portion of the vehicle.

Figure 9:
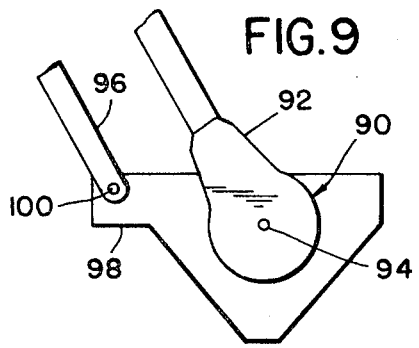
FIG. 9 is a diagrammatic view illustrating the manner in which the actuator may serve as the main pivot for a folding top structure, and includes the mechanism for swinging the main arm.

Referring now to FIG. 9 these arrangements are diagrammatically indicated where the actuator structure disclosed in detail herein is indicated generally at 90, and the actuating arm which is pivoted thereto is indicated at 94. If desired, the actuating link which connects to a portion of the articulated folding top structure, may be as indicated at 96, pivoted to an extension 98 of the actuator. Alternatively of course, the pivot mounting 100 may be to a part of the vehicle structurally independent of the actuator 90.

Figure 10:
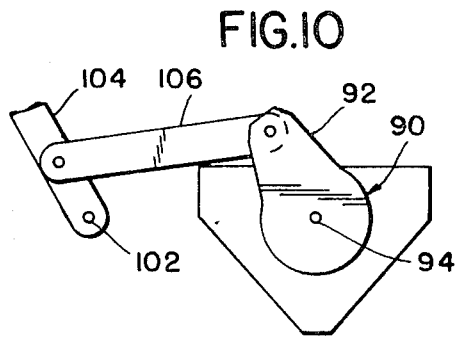
FIG. 10 is a diagrammatic view similar to FIG. 9 showing the attachment of the actuator to the main pivot of a folding top by means of a link.

Referring now to FIG. 10 there is diagrammatically illustrated another arrangement in which the main pivot of the folding top structure is indicated at 102. A portion of the folding top is indicated at 104 and it will be recognized that with this arrangement the link which produces folding of the articulated structure on swinging of the arm 104 is not shown. Here, the actuator shown in detail in the foregoing is again indicated at 90 and includes the actuating arm 92 which is pivoted to the actuator as indicated at 94. With this arrangement a parallel link 106 is provided connecting the actuating arm 92 to the mounting arm 104 of the folding top.

What I claim as my invention is:

1. An actuator comprising a mounting plate structure having a portion constituting a first wall, a cupped housing fixed to said plate, the bottom of said cup constituting a second wall spaced from said first wall, a pivot pin extending between said walls, an elongated internal ring gear fixed to one of said walls and extending toward the other of said walls, an actuating arm assembly comprising a pair of arm members rigidly secured together having matched cylindrical portions journaled on the exterior of said ring gear, and a series of planetary reduction gear sets carried by said pivot pin and including a final stage output planet set connected to said flat end wall.

2. An actuator as defined in claim 1 in which said one arm member has an end wall at the end of its cylindrical portion opposite the cylindrical portion of the other of said arm members, said ring gear and the said end wall constituting with said plate structure a complete enclosure for the gearing.

3. An actuator as defined in claim 2, said gearing including an input sun gear on said pin, a worm gear fixed to said input sun gear, a worm in mesh with said worm gear mounted on said plate structure, said plate structure comprising a fixed cover and mounting member in which said worm is mounted.

4. An actuator as defined in claim 1 including a pinion support plate parallel to said end wall, said gearing comprising output planet pinions journaled between the end wall of said cupped portion and said pinion support plate.

5. An actuator comprising a mounting plate having an enlarged circular opening therethrough, an elongated tubular ring gear having a cylindrical outer surface and being rigidly fixed at one end to said plate and surrounding said opening, an actuating arm structure having an elongated cylindrical portion at its inner end journaled on the outer cylindrical surface of said ring gear and having an end wall substantially closing the other end of said tubular ring gear, and a series of planetary gear sets within said ring gear including a set of output planet pinions journaled for rotation on the end wall of the cylindrical portion of said arm structure and in mesh with the teeth of said ring gear.

6. An actuator as defined in claim 5 in which said gear sets each includes a sun gear, a pivot pin on which said sun gears are mounted, and means rigidly connected to said plate supporting opposite ends of said pin.

7. An actuator as defined in claim 6 in which one of said gear sets comprises an input sun gear having a worm gear fixed thereto, a worm in mesh with said worm gear, a worm housing fixed to said plate and surrounding the enlarged opening therein and including means mounting said worm gear therein, said worm housing constituting the means for mounting one end of said pin.

8. An actuator as defined in claim 6 in which the means for mounting one end of said pin comprises a cupped housing fixed to said plate and open at one side to provide for movement of said arm structure.

9. An actuator as defined in claim 5, said actuator being a vehicle folding top lift actuator and said arm constituting the main pivot mounting for the folding top structure at one side of the vehicle.

10. An actuator as defined in claim 9 comprising a link pivoted to said plate for attachment to said top structure to control folding and unfolding movement thereof as a consequence of swinging movement of said arm.

11. An actuator comprising a mounting plate having a portion constituting a first wall, a cupped housing fixed to said plate and having a second wall spaced from said first wall, a pivot pin extending between said walls, an elongated tubular internal ring gear having a cylindrical outer surface, said ring gear being fixed to one of said walls and extending toward said other wall, an actuating arm having a cupped end portion journaled on the cylindrical exterior of said ring gear and having an apertured bottom wall through which said pin extends, said cupped housing having a lateral opening through which said arm extends, and a series of planetary reduction gear sets carried by said pivot pin and located within said tubular ring gear and including a final output planet set carried by the bottom wall of the cupped portion of said arm.

12. An actuator as defined in claim 11 in which said pivot pin extends through openings in said first and second walls, means mounting said pin in said openings and constituting closures for said openings, said last means together with said tubular ring gear and the cupped end portion of said arm constituting an enclosure for the planetary gearing located within said tubular ring gear.

13. An actuator as defined in claim 12 in which the means closing the opening in said mounting plate which receives said pin comprising a worm and worm gear housing, a worm and worm gear set in said last mentioned housing, and means connecting said worm gear to the input planetary gear set.

* * * * *